E. E. WHITE.
LAND MARKING ATTACHMENT FOR CORN PLANTERS.
APPLICATION FILED MAR. 25, 1912.

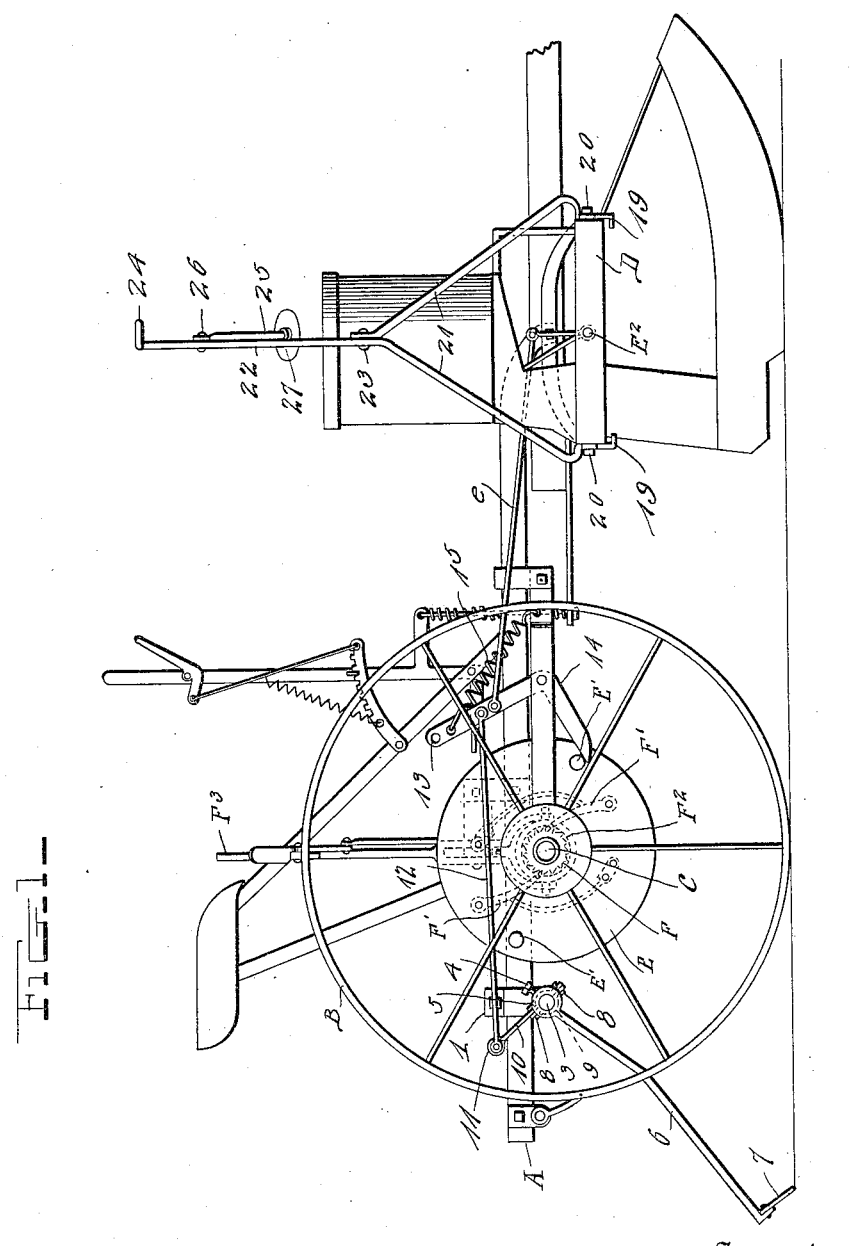

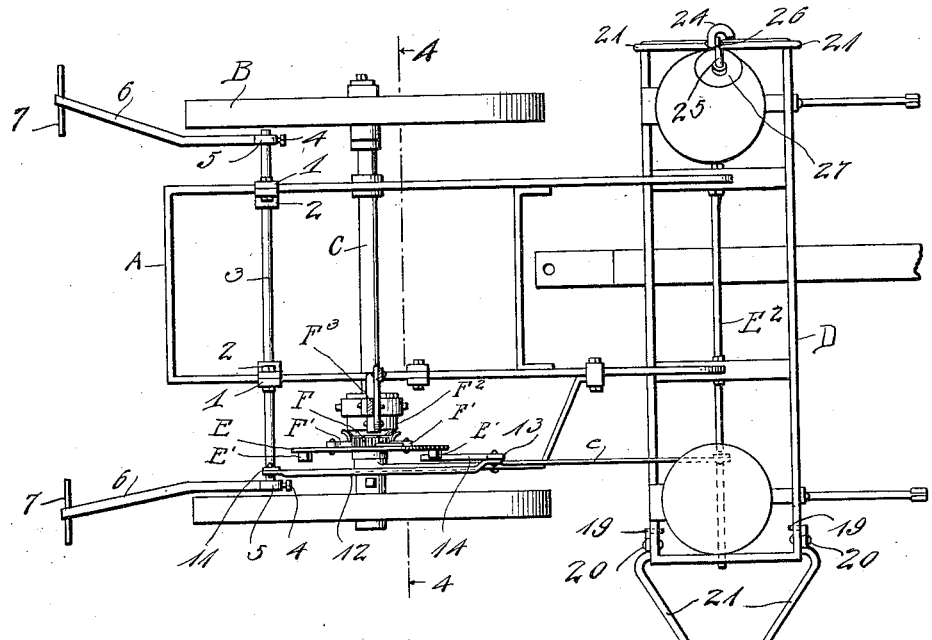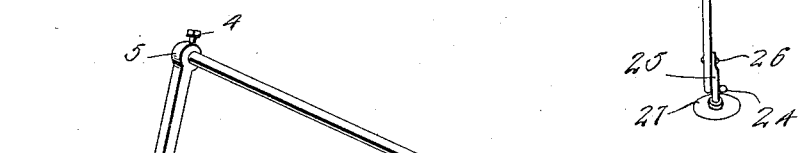

1,053,078.

Patented Feb. 11, 1913.

3 SHEETS—SHEET 3.

UNITED STATES PATENT OFFICE.

EDWARD E. WHITE, OF BRIGHTON, IOWA.

LAND-MARKING ATTACHMENT FOR CORN-PLANTERS.

1,053,078.  Specification of Letters Patent.  Patented Feb. 11, 1913.

Application filed March 25, 1912. Serial No. 686,139.

*To all whom it may concern:*

Be it known that I, EDWARD E. WHITE, a citizen of the United States, residing at Brighton, in the county of Washington and State of Iowa, have invented certain new and useful Improvements in Land-Marking Attachments for Corn-Planters; and I do declare the following to be a full, clear, and exact description of the invention, such as will enable others skilled in the art to which it appertains to make and use the same.

This invention relates to seeders and planters, and more especially to land-markers; and the object of the same is to produce a device of this character capable of attachment to a corn planter so that the driver may accurately check the rows across the field. This and other objects are accomplished by the construction hereinafter more fully described and claimed, and as shown in the drawings wherein—

Figure 1 is a side elevation of this machine complete, and Fig. 2 a plan view thereof. Fig. 3 is a perspective detail of the covering shovels. Fig. 4 is a cross section on the line 4—4 of Fig. 2. Fig. 5 is a diagrammatic plan view showing how the machine may be used to check a field in squares. Fig. 6 is a detail of one of the liners. Fig. 7 is an enlarged detail of the arm rising from the shovel shaft.

This invention is an improvement on Patent No. 760,045, issued May 17, 1904, to Joseph W. White, and in said patent, the frame A was mounted on wheels B and carried the usual front or runner frame D having the ordinary seed-dropping attachment and including the dropper or operating shaft $E^2$ whose oscillation at intervals caused the dropping of seed through the drills in a manner not necessary to amplify in the present specification. Adjacent the driver's seat was mounted a lever $F^3$ whose adjustment moved a cone sleeve $F^2$ so as to disengage pawls $F'$ from a ratchet wheel F which was secured fast on a disk E; and the latter, mounted loosely on the axle C, was adapted by its rotation to actuate the dropper or operating shaft $E^2$ through devices without novelty, but certain of which or parts of which have been employed in the present invention as will be explained below. As the corn planter passed over the ground, the rotation of the disk E caused the dropping of seed through the drills at intervals dependent upon the position of the lugs $E'$. All of these features of construction are employed in the present instance, either in the precise form shown in the patent above referred to or on a corn planter of any suitable make which will answer the requirement.

The numerals 1 designate clips by means of which bearings 2 are secured to the main frame A, and through such bearings is journaled a shaft 3. Mounted thereon near its ends by means of set screws 4 are eyes 5 at the upper extremities of two shovel-arms 6 which are deflected downward and have heads or shovels 7 at their rear and lower extremities as shown, each traveling in rear of one wheel and being of such shape as to cover the hill of corn just dropped and also to make a mark indicating that it has been covered. Adjustably secured to the shaft 3 by means of two bolts 8 and a clip plate 9 is an arm 10 having an eye 11 in its upper end, and linked into this eye is a rod 12 leading forward to and engaged with the upright arm 13 of a bell-crank lever 14 whose lower arm is depressed at intervals by the lugs $E'$ on the disk E in a manner referred to above, against the tension of its spring 15. Said upright arm 13 is also connected by a rod $e$ with the dropper or operating shaft $E^2$ as indicated in the drawings and as suggested but not described in the Letters Patent above referred.

The principal feature of my invention consists in the "liners" whereof two are employed, and as they are duplicates I will describe but one. It is by preference made in two members of stiff wire or light rods, the innermost in two rods 21 pivoted at 20 to the frame D and hooked under the latter as at 19 for a purpose to be described, thence converging toward each other and connected at 23, thence continued outward in a single rod 22 provided at its outer end with an indicating device which by preference is a hook 24 as shown in Figs. 2 and 6; and the hook is disposed the same distance from the discharge spout or drill of the adjacent seed-dropping mechanism as the distance between the two rows of corn. The outer member is by preference composed of a short piece of wire or rod 25 pivoted at 26 to the single rod 22 and adapted to be turned outward so as to lie within the hook 24, and a disk 27 journaled on the outer end of this piece so that it may be used to scratch a line across the field as seen at the top of the diagram illustrated in Fig. 5. This is obviously for the purpose of guiding the operator when he returns on the next trip across the field. At other times the short arm 25 is thrown back out of the hook 24 into the position seen in Fig. 6, and the entire liner is held suspended above the ground by the fingers 19 engaging under the frame D so that the hook constitutes an indicating device by which the operator can be guided in a manner to be set forth below.

In operation the main lever F³ is moved to connect the disk E with the rotating axle, and the lugs E' thereon move the bell crank lever 14 at proper intervals (according to the number and disposition of said lugs) so that the rod e oscillates the dropper or operating shaft E² and a hill of corn or other seed is dropped through the drill. But the rearward movement of the upright arm 13 of the bell-crank lever also pushes upon the rod 12, which through the arm 10 rocks the shaft 3 and forces the shovels 7 downward into contact with the earth so that the hill previously dropped by each drill is covered and a scratch or mark made on the path just left by the wheel, to guide the operator in his next trip across the field. It will be understood that the shovels must be disposed exactly at proper distances to the rear of the drills so that they will operate successfully in the manner just described, and if the field is to be planted in squares, as seen in Fig. 5, this distance will equal that laterally between the drill and the hook at the outer end of the liner, and the two drills will be spaced apart the same distance. Having planted two rows across the field, the operator turns the machine around, throws out the opposite liner, and commences planting the next two rows. Assuming now that he observes by the position of the hook 24 with respect to the marks left by the shovels 7, that on this trip he is not dropping the hills of seed on lines across the field which are opposite the points where the dropping occurred on his previous trip—he has but to accelerate or retard the planting action, and that can be controlled by proper manipulation of the lever F³ in a manner well understood and fully described in the patent above referred to. I do not wish to be limited to the strict details of construction, as such changes as come within the spirit of this invention may be made.

What is claimed as new is:

1. In a marking attachment for planting machines, the combination with the drills spaced a given distance apart, the seed-dropping mechanism, and means for actuating the same; of covering shovels disposed in rear of the wheels and spaced as far in rear of the drills as the latter are spaced apart, actuating means therefor connected with the dropping mechanism, and two liners each hinged at its inner end to the frame and having an indicating device at its outer end disposed as far to one side of the adjacent drill as the latter is spaced from the other drill.

2. In a marking attachment for planting machines, the combination with the seed-planting mechanism including a frame; of a marker comprising an inner member composed of two rods pivoted at their inner extremities to said frame and converging to a meeting point and thence projecting outward in an arm having a hook at its outer end, and an outer member pivoted to said arm and adapted to lie in the hook and having a disk mounted rotatably on its outer end.

3. In an attachment for planting machines, the combination with the drills spaced a given distance apart, the seed-dropping mechanism, and means for actuating the same; of an indicating device consisting of a rod pivoted to the frame of said mechanism and having a finger adjacent its pivot and at the inner end of the rod which engages under the frame and holds the outer end of the rod above the ground, for the purpose set forth.

In testimony whereof I have hereunto set my hand in presence of two subscribing witnesses.

EDWARD E. WHITE.

Witnesses:
J. M. STONE,
C. V. ROBISON.

---

Copies of this patent may be obtained for five cents each, by addressing the "Commissioner of Patents, Washington, D. C."